Jan. 16, 1923.
C. L. GEHNRICH.
PORTABLE OVEN.
FILED MAR. 8, 1922.
1,442,393.
2 SHEETS—SHEET 2.
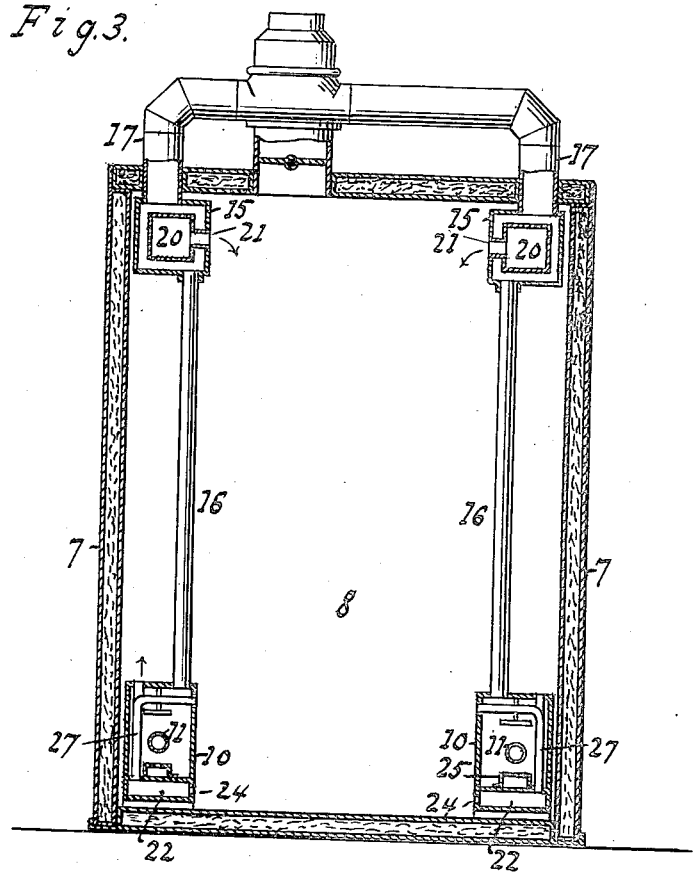
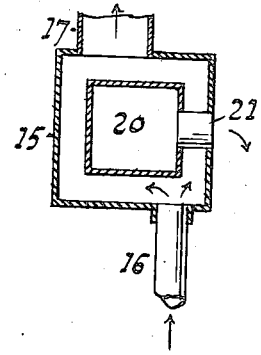
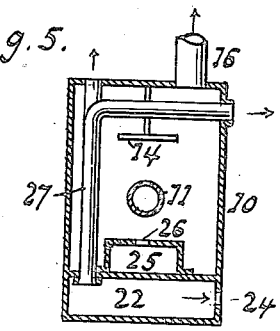
INVENTOR.
Charles L. Gehnrich
BY
ATTORNEYS Patented Jan. 16, 1923.

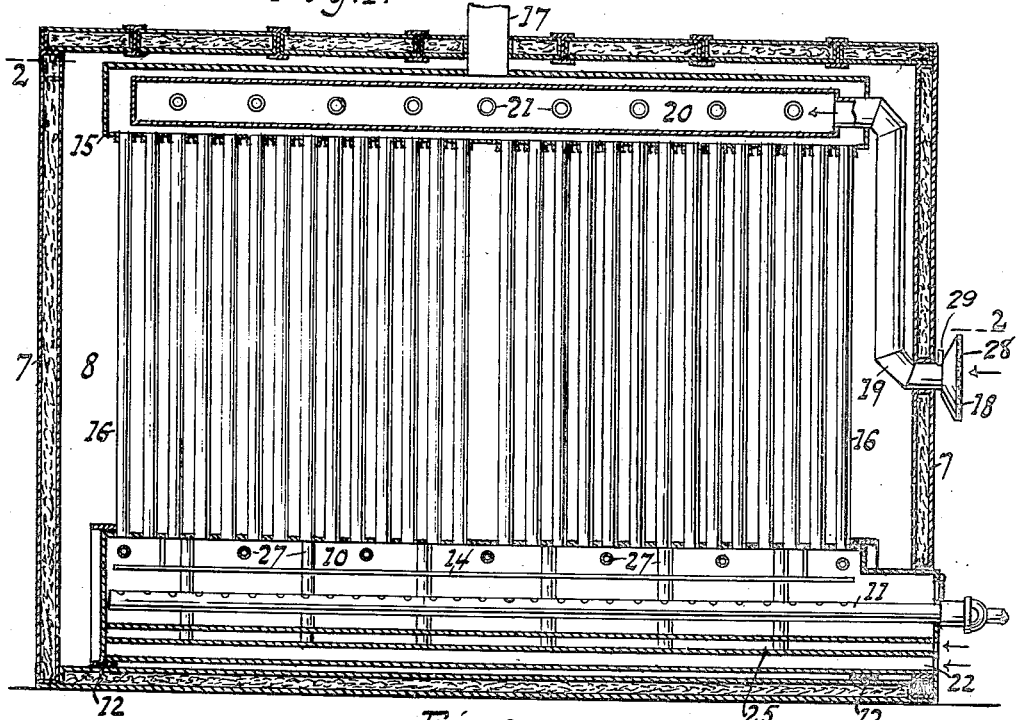
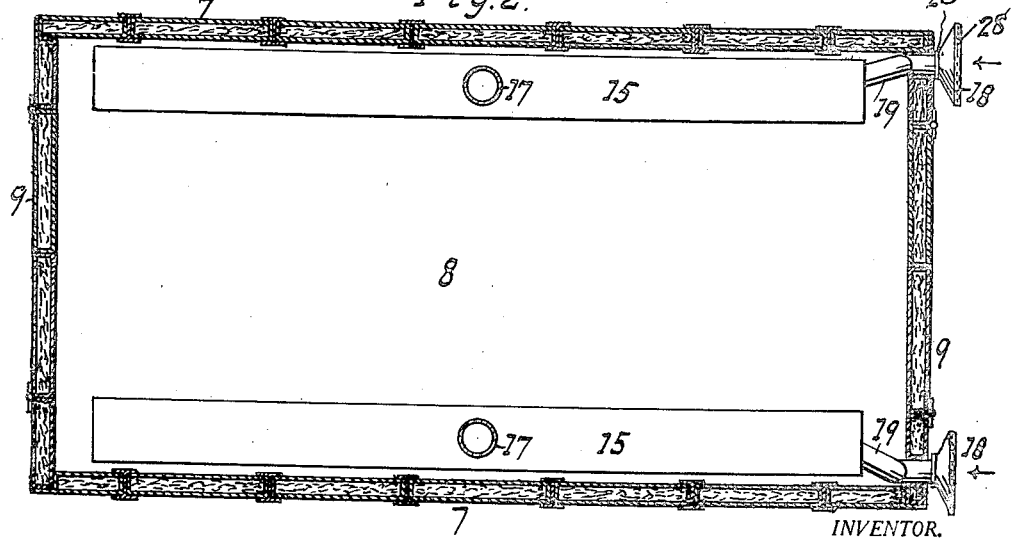

1,442,393

UNITED STATES PATENT OFFICE.

CHARLES L. GEHNRICH, OF ELMHURST, NEW YORK.

PORTABLE OVEN.

Application filed March 8, 1922. Serial No. 542,023.

*To all whom it may concern:*

Be it known that I, CHARLES L. GEHNRICH, a citizen of the United States, residing at Elmhurst, in the county of Queens and State of New York, have invented new and useful Improvements in Portable Ovens, of which the following is a specification.

This invention relates essentially to the radiator type of oven in which the indirect heat from a combustible, preferably gas, is utilized for baking enamels, japans and lacquers on metal articles or for drying all materials emitting combustible vapors placed in the baking compartment.

One of the objects of the present invention is to enclose a fresh air conduit in the upper heat duct so that the heat circulating within the duct entirely surrounds the conduit thereby preheating the air before it is sucked into the baking compartment.

Another object of the invention is to construct the combustion, upper duct chamber and their connecting radiator tubes, so that they can be removed as a single unit from the baking compartment when making repairs or to replace any of the parts.

Another object of the invention is to equip the bottom of the combustion chamber with a fresh air intake duct communicating with a series of outlets in proximity to the floor of the baking compartment so as to drive upward any of the heavy gases or vapors settling near the floor.

Another object of the invention is to connect the lower fresh air duct with the baking compartment at different points from the combustion chamber to distribute preheated air.

Another object of the invention is to provide the combustion chamber with a second fresh air duct above the last named, the air sucked therein being conducted into the combustion chamber so as to provide sufficient oxygen to support the flame.

The invention resides in the novel combinations hereinafter described and claimed, reference being made to the accompanying drawings in which:

Figure 1 represents a longitudinal vertical section of an oven embodying this invention.

Figure 2 is a horizontal section taken along the line 2—2 of Figure 1.

Figure 3 is a vertical transverse section of the same.

Figure 4 is a detail view on an enlarged scale of a heat duct.

Figure 5 is a similar view of a combustion chamber.

In the drawings the numeral 7 designates a casing which is constructed of a number of sections and adapted to enclose a baking compartment 8 suitable for receiving the articles to be baked. Each section has a double lining with a non-heat conductor therebetween and the sections are removable to permit the oven to be taken down and readily transported. The casing has swinging doors 9 at the front and rear to facilitate loading or unloading of the articles placed in the bake compartment.

In the lower portion of the bake compartment is arranged a combustion chamber 10 having a burner tube 11 located therein made to consume gas or any other suitable combustible. The chamber has offsets 12 at each end to elevate the bottom and permit circulation of air. A baffle plate 14 suspended above the burner tube deflects the flame.

In the upper portion of the bake compartment is located a heat duct 15 spaced from the walls and connected to the combustion chamber by a series of radiator tubes 16 arranged vertically in a row. There are two of the above units in the bake chamber as indicated in Figure 3, one being a duplication of the other, and a chimney 17 connecting both ducts leads off the products of combustion from the ducts and also from the bake chamber.

As shown the combustion chamber and the duct with their connecting tubes are spaced from the casing at all points so that the entire surface of the conducting unit will radiate the heat into the bake compartment. The unit is supported at the bottom of the casing and none of the parts thereof are bolted or fastened to the casing. The unit can be assembled outside of the casing and then set up in the casing. When it is desired to repair any of the parts the unit can be easily removed merely by disconnecting the chimney.

The fresh air inlet associated with the heat duct includes a funnel shaped member 18 as indicated in Figures 1 and 2 extending through the front wall of the casing. The funnel communicates with a pipe 19 projecting upwardly in the bake chamber and the pipe is connected to a conduit 20 arranged in the heat duct. The duct and the conduit are rectangular transversely and the duct completely surrounds the conduit which is closed at one end so that its entire surface will be in contact with the heat passing through the duct. The fresh air is thereby preheated and is conducted by a series of tubes 21 into the upper part of the baking chamber.

Located in the bottom of the combustion chamber is a duct 22 closed at one end with a fresh air intake at its other end extending through the lower front wall of the casing and a series of small vents or outlets 24 in the lower side of the chamber communicating with the duct permits the preheated air to pass into the bake compartment. By this means the pure air is sucked in near the bottom of the bake chamber and circulates with the heated air in the bottom of the chamber.

A secondary fresh air duct 25 closed at one end is situated above the duct in the combustion chamber. The upper wall of the duct is perforated at 26 to admit fresh air into the combustion chamber to feed the flame. A series of tubes 27 connect the duct 22 with the bake compartment. These tubes alternately pass over the baffle plate to the side of the combustion chamber, and up through the top of the chamber to direct the preheated air at different angles into the bake compartment. By the above arrangement preheated air is continually combined with the dense heated air and gases in the bottom portion of the bake chamber from practically all points of the combustion chamber.

The fresh air entering the upper heat duct is primarily heated by being conducted through the pipe in the bake compartment and the air flowing into the conduit receives more heat from the outgoing gases in the duct. This mode of sucking fresh air into the upper part of the bake compartment in conjunction with the lower fresh air ducts materially adds to the distribution and heat circulation in the bake compartment. The intake end of the fresh air funnel 18 is equipped with a foraminated cover 28 to prevent any particles of dirt from being sucked in with the air and the pipe 19 is provided with a damper 29 of well-known construction at its mouth to regulate the volume of air.

I claim:

1. In a portable oven the combination with a baking compartment, of a heat duct arranged in the compartment, a fresh air conduit surrounded by the duct, and means connecting the conduit with the bake compartment.

2. In a portable oven the combination with a casing for enclosing a baking compartment, of a heat duct arranged in the upper portion of the compartment, a fresh air inlet having a mouth leading into the casing with a tube projecting upwardly in the compartment, a conduit communicating with the tube extending into the duct, and a series of tubes connecting the conduit with the bake compartment.

3. In a portable oven the combination with a casing, of a combustion chamber removably supported on the bottom of the casing, a heat duct arranged in the upper part of the casing, a series of vertically disposed radiator tubes connecting the combustion chamber with the duct, said elements constituting a removable heat unit spaced from the casing.

4. In a portable oven the combination with a casing, of a combustion chamber, arranged in the casing, fresh air ducts closed at one end located in the chamber, means for conducting the air from one of the ducts into the interior of the casing, and means for connecting the other duct with the interior of the combustion chamber.

5. In a portable oven the combination with a casing, of a combustion chamber arranged in the casing, fresh air inlet ducts closed at one end located in the chamber, means for conducting the air from one of the ducts to different points in the interior of the casing, and a series of holes connecting the other duct with the interior of the combustion chamber.

6. In a portable oven the combination with a casing for enclosing a bake compartment, of a combustion chamber arranged in the lower portion of the casing, a heat duct connected to the chamber, means enclosed in the heat duct for admitting fresh preheated air into the upper portion of the bake compartment, and a plurality of ducts associated with the combustion chamber to draw preheated air into the bottom portion of the bake compartment.

In testimony whereof I have hereunto set my hand in the presence of two subscribing witnesses.

CHARLES L. GEHNRICH.

Witnesses:
INEZ M. SCHOMBS,
WILLIAM MILLER.